(12) United States Patent
Zou et al.

(10) Patent No.: US 11,093,981 B2
(45) Date of Patent: Aug. 17, 2021

(54) SMART BROADCASTING DEVICE

(71) Applicant: Advanced New Technologies Co., Ltd., Grand Cayman (KY)

(72) Inventors: Qimeng Zou, Hangzhou (CN); Jiankang Sun, Hangzhou (CN); Yao Qin, Hangzhou (CN); Linqing Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/194,888

(22) Filed: Mar. 8, 2021

(65) Prior Publication Data

US 2021/0192579 A1    Jun. 24, 2021

Related U.S. Application Data

(63) Continuation of application No. 16/810,785, filed on Mar. 5, 2020, now Pat. No. 10,943,272, which is a (Continued)

(30) Foreign Application Priority Data

Dec. 29, 2017  (CN) .......................... 201711484238.6

(51) Int. Cl.
*G06Q 30/02* (2012.01)
*G06F 3/16* (2006.01)
(Continued)

(52) U.S. Cl.
CPC ......... *G06Q 30/0277* (2013.01); *G06F 3/165* (2013.01); *G06Q 30/0263* (2013.01);
(Continued)

(58) Field of Classification Search
CPC ......... H04L 67/06; H04L 67/26; H04L 67/42; H04L 63/0428; G06Q 30/0277; G06Q 30/0263; G06F 3/165; G10L 25/51
See application file for complete search history.

(56) References Cited

U.S. PATENT DOCUMENTS 6,374,177 B1 *  4/2002  Lee .......................... G01C 21/32
                                                        340/988
10,943,272 B2 *  3/2021  Zou ..................... H04L 65/4076
(Continued)

FOREIGN PATENT DOCUMENTS

CN    105654973    6/2016
CN    105721603    6/2016
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Michael C Lai
(74) *Attorney, Agent, or Firm* — Fish & Richardson P.C.

(57) ABSTRACT

Methods, systems, and apparatus, including computer programs encoded on computer storage media, for broadcasting audio. In one aspect, the method includes receiving, from a server by a smart broadcasting device associated with a service client, an audio broadcast instruction; in response to receiving the audio broadcast instruction, downloading an audio file corresponding to the audio broadcast instruction, wherein the audio file comprises a marketing content related to services provided by the server to the service client associated with the smart broadcasting device; and broadcasting, by the smart broadcasting device, the audio file by using a speaker of the smart broadcasting device.

21 Claims, 5 Drawing Sheets

Related U.S. Application Data continuation of application No. PCT/CN2018/116108, filed on Nov. 19, 2018.

(51) Int. Cl.
  *G10L 25/51* (2013.01)
  *H04L 29/06* (2006.01)
  *H04L 29/08* (2006.01)

(52) U.S. Cl.
  CPC .......... *G10L 25/51* (2013.01); *H04L 63/0428* (2013.01); *H04L 67/06* (2013.01); *H04L 67/26* (2013.01); *H04L 67/42* (2013.01)

(56) References Cited

U.S. PATENT DOCUMENTS

| | | | | |
|---|---|---|---|---|
| 2005/0021398 | A1* | 1/2005 | McCleskey | H04L 67/1082 705/14.47 |
| 2006/0031548 | A1* | 2/2006 | Funchess | H04N 21/2547 709/231 |
| 2008/0133696 | A1* | 6/2008 | Hanebeck | H04N 21/234336 709/217 |
| 2008/0167957 | A1* | 7/2008 | Steelberg | G06Q 30/0267 705/14.64 |
| 2009/0157781 | A1* | 6/2009 | Lee | G06F 21/10 708/250 |
| 2009/0264070 | A1* | 10/2009 | Lim | G06Q 30/0261 455/41.2 |
| 2009/0281907 | A1* | 11/2009 | Skog | H04L 65/608 705/26.1 |
| 2011/0029385 | A1 | 2/2011 | Engel et al. | |
| 2013/0275221 | A1* | 10/2013 | Zeto, III | G06Q 30/02 705/14.58 |
| 2016/0014474 | A1* | 1/2016 | Lee | H04N 21/812 725/5 |
| 2020/0211064 | A1 | 7/2020 | Zou et al. | |

FOREIGN PATENT DOCUMENTS

| | | |
|---|---|---|
| CN | 106529631 | 3/2017 |
| CN | 107423974 | 12/2017 |
| CN | 107480965 | 12/2017 |
| CN | 108234636 | 6/2018 |
| CN | 104602223 | 5/2021 |
| EP | 3594878 | 1/2020 |

OTHER PUBLICATIONS

Extended Search Report in European Appln No. 18894335.1, dated Aug. 18, 2020, 11 pages.

Nakamoto, "Bitcoin: A Peer-to-Peer Electronic Cash System," www.bitcoin.org, 2005, 9 pages.

PCT International Preliminary Report on Patentability in International Appln No. PCT/CN2018/116108, dated Jun. 30, 2020, 11 pages.

PCT International Search Report and Written Opinion in International Appln No. PCT/CN2018/116108, dated Jan. 30, 2019, 9 pages (with partial English translation).

* cited by examiner

SMART BROADCASTING DEVICE

CROSS-REFERENCE TO RELATED APPLICATIONS

This application is a continuation of and claims the benefit of priority of U.S. patent application Ser. No. 16/810,785, filed Mar. 5, 2020, which is a continuation of PCT Application No. PCT/CN2018/116108, filed on Nov. 19, 2018, which claims priority to Chinese Patent Application No. 201711484238.6, filed on Dec. 29, 2017, and each application is hereby incorporated by reference in its entirety.

TECHNICAL FIELD

This specification relates to the field of computer application, and in particular, to an audio broadcast method, apparatus and system and a smart broadcast device.

BACKGROUND

In some scenarios, a user can usually interact with a background server through a service client equipped on a mobile terminal to complete some corresponding business operations online. For a service provider of the background server who provides a service to the service client, in addition to a need to interact with the service client on a user side through the background server and push service information related to a carried service operation to the service client, usually, some marketing information related to a service carried on the service client will also be pushed to the user through the service client. Therefore, in practical application, how to push these marketing information to the user in a more personalized and intuitive manner is of significance to improve both of the marketing effect of the service provider and the user experience.

SUMMARY

The present specification provides an audio broadcast method, applied to an smart broadcast device, the method including: receiving an audio broadcast instruction pushed by a server; in response to the audio broadcast instruction, downloading an audio file corresponding to the audio broadcast instruction, wherein the audio file includes a marketing content related to a service carried on a service client interfacing with the server; and broadcasting the audio file through an equipped audio player.

Optionally, receiving the audio broadcast instruction pushed by the server includes: receiving the audio broadcast instruction pushed by the server through an encrypted data connection channel.

Optionally, the audio broadcast instruction includes a file name corresponding to the audio file, and a download address corresponding to the audio file; downloading the audio file corresponding to the audio broadcast instruction includes: searching locally to determine whether an audio file corresponding to the file name in the audio broadcast instruction is stored; and if an audio file corresponding to the file name is not stored locally, downloading the corresponding audio file based on the download address in the audio broadcast instruction.

Optionally, the audio file is stored on a third-party storage platform separate from the server.

Optionally, the audio broadcast instruction further includes a verification value generated based on an original file content of the audio file; before broadcasting the audio file through the equipped audio player, the method further includes: performing a calculation on a file content of the downloaded audio file, to determine a verification value; determining whether the determined verification value matches a verification value in the audio file; and if the acquired verification value matches the verification value in the audio file, broadcasting the audio file through the equipped audio player.

Optionally, the audio broadcast instruction is proactively pushed by the server based on a configuration, or pushed by the server upon being triggered by receiving an interface invocation with respect to an Application Programming Interface (API) related to the service, which is initiated by the service client.

The present specification further provides an audio broadcast apparatus, applied to an smart broadcast device, the apparatus including: a receiving module, configured to receive an audio broadcast instruction pushed by a server; a download module, configured to, in response to the audio broadcast instruction, download an audio file corresponding to the audio broadcast instruction, wherein the audio file includes a marketing content related to a service carried on a service client interfacing with the server; and a broadcast module, configured to broadcast the audio file through an equipped audio player.

Optionally, the receiving module is further configured to: receive the audio broadcast instruction pushed by the server through an encrypted data connection channel.

Optionally, the audio broadcast instruction includes a file name corresponding to the audio file, and a download address corresponding to the audio file; the download module is further configured to: search locally to determine whether an audio file corresponding to the file name in the audio broadcast instruction is stored; and if an audio instruction corresponding to the file name is not stored locally, download the corresponding audio file based on the download address in the audio broadcast instruction.

Optionally, the audio file is stored on a third-party storage platform separate from the server.

Optionally, the audio broadcast instruction further includes generating a verification value based on an original file content of the audio file; the download module is further configured to: before broadcasting the downloaded audio file through the equipped audio player, perform a calculation on a file content of the audio file to acquire a verification value; determine whether the acquired verification value matches a verification value in the audio file; and if the acquired verification value matches the verification value in the audio file, broadcast the audio file through the equipped audio player.

Optionally, the audio broadcast instruction is actively pushed by the server based on a configuration, or pushed by the server in a triggering manner upon receiving an interface invoking with respect to an API related to the service, which is initiated by the service client.

The present specification further provides an audio broadcast system, including: a server, a service client interfacing with the server, and a smart broadcast device interfacing with the server, wherein, the server is configured to transmit an audio broadcast instruction to the smart broadcast device, wherein the audio broadcast instruction is used to trigger the smart broadcast device to download an audio file corresponding to a marketing content related to a service carried on the service client; the smart broadcast device is configured to, in response to the audio broadcast instruction, download the audio file, and broadcast the audio file through an equipped audio player.

Optionally, the server is further configured to: actively push the audio broadcast instruction to the smart broadcast device based on a configuration; or upon receiving an interface invoking with respect to an API related to the service initiated by the service client, push the audio broadcast instruction to the smart broadcast device in a triggering manner.

Optionally, the audio broadcast instruction includes a file name corresponding to the audio file, and a download address corresponding to the audio file; the smart broadcast device is further configured to: search locally to determine whether an audio file corresponding to the file name in the audio broadcast instruction is stored; and if an audio file audio instruction corresponding to the file name is not stored locally, download the corresponding audio file based on the download address in the audio broadcast instruction.

Optionally, the system further includes: a third-party storage platform, configured to store the audio file corresponding to the audio broadcast instruction; the smart broadcast device is further configured to: download the corresponding audio file from the third-party storage platform based on the download address in the audio broadcast instruction.

Optionally, the audio broadcast instruction further includes a verification value generated based on an original file content of the audio file; the smart broadcast device is further configured to: before broadcasting the audio file through the equipped audio player, perform a calculation on a file content of the downloaded audio file to acquire a verification value; determine whether the acquired verification value matches a verification value in the audio file; and if the acquired verification value matches the verification value in the audio file, broadcast the audio file through the equipped audio player.

The present specification further provides a smart broadcast device, including: a processor; a memory for storing machine executable instructions; wherein, by reading and executing the machine executable instructions corresponding to a control logic of an audio broadcast stored in the memory, the processor is caused to: receive an audio broadcast instruction pushed by a server; in response to the audio broadcast instruction, download an audio file corresponding to the audio broadcast instruction, wherein the audio file includes a marketing content related to a service carried on a service client interfacing with the server; and broadcast the audio file through an equipped audio player.

According to the technical solutions provided by the examples of the present specification, in one aspect, online audio broadcasting the marketing content related to the service carried on the service client interfacing with the server by means of the smart broadcast device interfacing with the server can more humanly and intuitively push the marketing content to the user and help to improve user experience. In another aspect, since online interaction is not required any longer between the smart broadcast device and the service client, decoupling between the smart broadcast device and the service client is fundamentally achieved, so that the server, by transmitting the audio broadcast instruction to the smart broadcast device, can trigger the smart broadcast device to download the audio file corresponding to the audio broadcast instruction and locally audio broadcast the audio file, thereby reducing the implementation complexity when the server pushes the marketing content to the user.

DETAILED DESCRIPTION OF THE EXAMPLES

The present specification is intended to provide a technical solution of online audio broadcasting a marketing content related to a service carried on a service client interfacing with a server by means of a smart broadcast device interfacing with the server.

Before or during the implementation, the smart broadcast device can establish a data connection with the server to serve as an instruction channel for reception of an instruction from the server. The service client can also establish a data connection with the server to serve as an interaction channel for business interaction between the service client and the server. The smart broadcast device may, but need not, maintain any form of data connection with the service client.

The server, when pushing the marketing content related to the service carried on the service client to a user through the smart broadcast device, can push an audio broadcast instruction to the smart broadcast device through the instruction channel. The audio broadcast instruction is configured to trigger the smart broadcast device to download an audio file corresponding to the marketing content. The smart broadcast device, when receiving the audio broadcast instruction, can, in response to the audio broadcast instruction, download an audio file corresponding to the audio broadcast instruction, and play the audio file through an equipped audio player after completing the download.

In the above technical solution, in one aspect, online audio broadcasting the marketing content related to the service carried on the service client interfacing with the server, by means of the smart broadcast device directly interfacing with the server, can more humanly and intuitively push the marketing content to the user and help to improve user experience.

In another aspect, since online interaction is not required any longer between the smart broadcast device and the service client, decoupling between the smart broadcast device and the service client is fundamentally achieved, so that the server, by transmitting the audio broadcast instruction to the smart broadcast device, can trigger the smart broadcast device to actively download the audio file corresponding to the audio broadcast instruction and locally audio broadcast the audio file, thereby reducing the implementation complexity when the server pushes the marketing content to the user.

The specification will be described hereinafter through specific examples and in combination with specific application scenarios.

Figure 1:
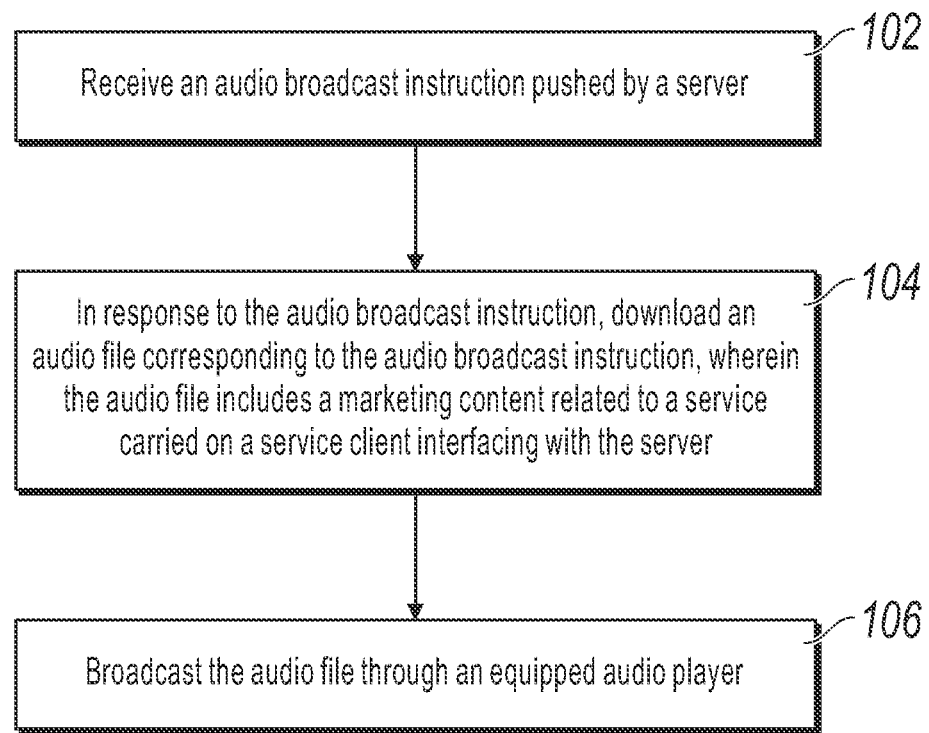
FIG. 1 is a flowchart illustrating an audio broadcast method, according to an example implementation of the present specification.

FIG. 1 shows an audio broadcast method according to an example of the present specification, which is applied to an audio broadcast system. The audio broadcast system includes a server, a service client interfacing with the server, and a smart broadcast device interfacing with the server, and performs the following steps.

At step 102, the server transmits an audio broadcast instruction to the smart broadcast device, wherein the audio broadcast instruction is used to trigger the smart broadcast device to download an audio file corresponding to a marketing content related to a service carried on the service client.

At step 104, in response to the audio broadcast instruction, the smart broadcast device downloads the audio file corresponding to the audio broadcast instruction.

At step 106, the smart broadcast device broadcasts the audio file through an equipped audio player.

The smart broadcast device can include any form and shape of smart broadcast device with an audio broadcast function. In practical application, the smart broadcast device can be managed, owned, standardized and customized uniformly by a service provider corresponding to the service client, so that the smart broadcast device can be connected with a background server corresponding to the service client.

For example, in a scenario, the service client can be a payment client (such as an APP), and the service provider of the payment client can connect the smart broadcast device with a background payment server at a business level to realize interconnection and interworking between the smart broadcast device and the payment server, and thereby, the payment server can push marketing contents related to payment services carried on the payment client to the user in form of audio broadcast through the smart broadcast device.

The marketing contents can include any form of service contents customized by the service provider of the service client and related to the service carried on the service client. For example, the marketing content described in this specification can be covered in all marketing contents pushed by the server to the service client in traditional marketing content pushing manners.

In this specification, the marketing content can include the following two types.

One is a service prompt content that can reflect a service execution state during the service interaction between the server and the service client. For example, the service client is the payment client previously described. In this case, the marketing content can include a payment prompt content, such as a successful receipt prompt content and a successful payment prompt content, pushed by the server to the user when the user interacts with the server through the payment client to complete online payment.

The other is a promotion content customized by the service provider of the service client and related to the service carried on the service client. For example, the service client is still the payment client. In this case, the marketing content can include a promotion content related to a payment service customized by the service provider of the payment client, such as special offers and a push content related to a promotion activity.

Figure 2:
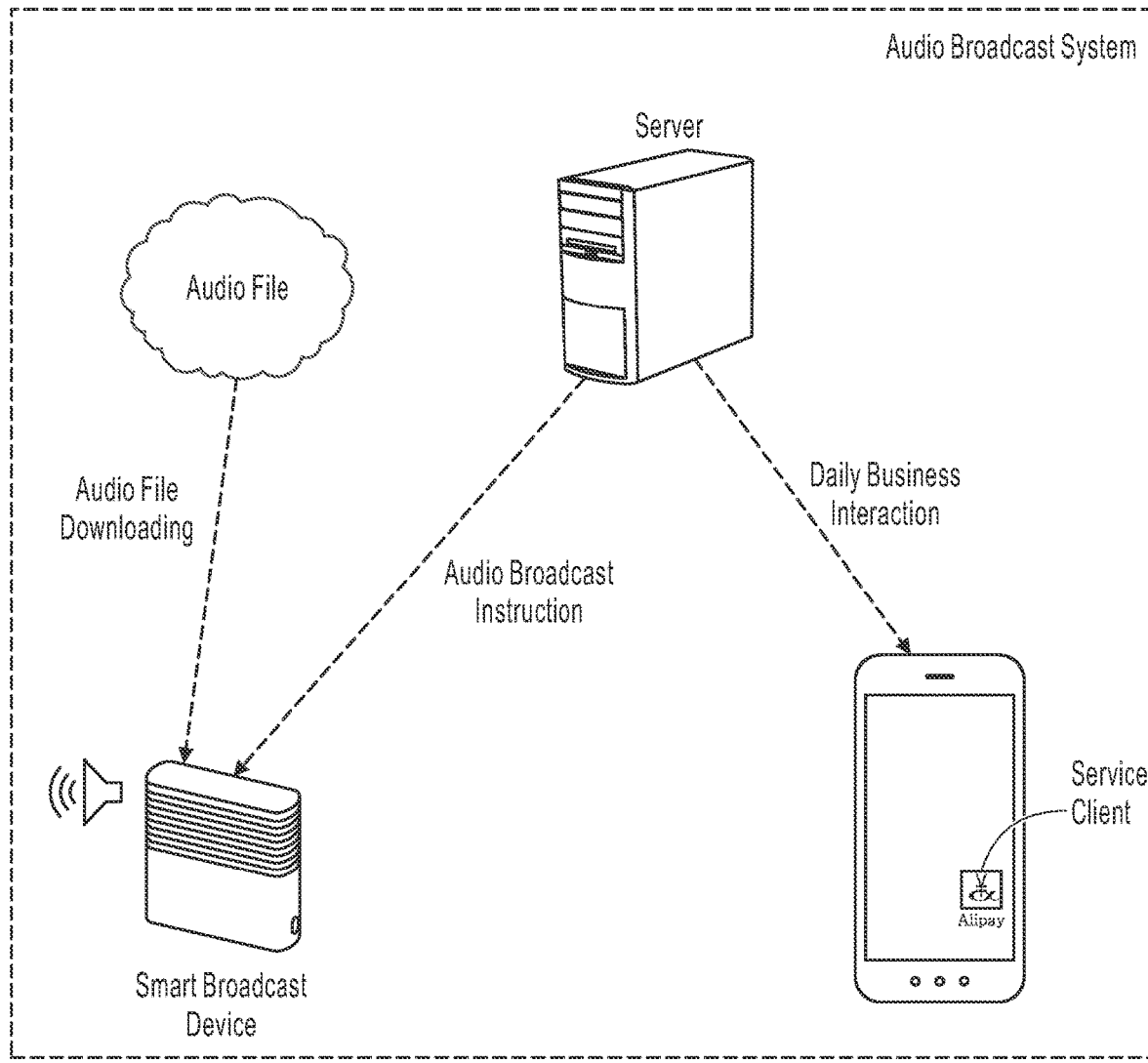
FIG. 2 is a structural diagram illustrating an audio broadcast system, according to an example implementation of the present specification.

FIG. 2 is a structural diagram illustrating an audio broadcast system according to the present specification.

As shown in FIG. 2, the audio broadcast system can include nodes such as a server, a service client interfacing with the server, and a smart broadcast device interfacing with the server.

The server provides service support to the service client and the smart broadcast device. In one aspect, the user can perform corresponding business interaction with the server through the service client to complete daily online business operations. In another aspect, the user can deploy the smart broadcast device in an offline environment where it is located, and use the smart broadcast device to audio broadcast the marketing content pushed by the server and related to the service carried on the service client.

For example, the service client is a payment client of an offline merchant. In one aspect, the offline merchant can interact with a background payment server through the payment client to complete corresponding offline payment operation. In another aspect, the offline merchant can deploy a smart broadcast device in an environment where the merchant is located, and use the smart broadcast device to broadcast, to the merchant and other customers, a marketing content related to a payment service pushed by the server.

The service client can provide the user with various portals related to the service carried thereon through a visual user interface. The user can trigger corresponding portal to trigger the service client to perform business interaction with the server to complete corresponding business function.

The service client is associated with the smart broadcast device. In various implementations, the association can be established when the user of the client device first launches the business interaction with the server, e.g., before the very first audio broadcast instruction is sent to the smart broadcast device by the server. For example, the association is established when a same user account is used to log onto both the client device and the smart broadcast device, when both the client device and the smart broadcast device are connected to a same network, or as identified by the client device through the APIs provided by the server.

The smart broadcast hardware is configured to receive the audio broadcast instruction transmitted by the server, and in response to the audio broadcast instruction, complete operations such as downloading and broadcasting of an audio file corresponding to the audio broadcast instruction in a local operating environment.

In this specification, the smart broadcast device can be equipped with a processor such as a microcontroller unit (MCU), communication hardware, or an audio player.

The processor can maintain a connection with the communication hardware and the audio player at the same time. The specific connection method is not described in detail in this specification.

The communication hardware is configured to communicate with the outside through a wireless and/or wired connection. The smart broadcast device can communicate with an external device through the communication hardware to complete operations such as receiving an instruction and downloading an audio file.

In practical application, the communication hardware can be wireless communication hardware or wired communication hardware; or the communication hardware can also be hardware that integrates both a wireless communication function and a wired communication function.

In an example, the communication hardware can be WI-FI hardware such as a WI-FI chip. The smart broadcast device can access a WI-FI hotspot in an offline place through the WI-FI hardware, to establish a wireless connection with the server, and wirelessly communicate with a server of the offline shopping place through the wireless connection.

The audio player includes a player for decoding an audio file at a software level, and a speaker for receiving an invoking instruction of the processor at a hardware level, to audio broadcast an audio file downloaded locally by the smart broadcast device. The specific type of the player is not particularly limited in this specification. Any form of players that can be adapted to the format of the audio file downloaded locally, for example, a more general MP3 player, can be adopted.

The technical solution of the present specification will be described in detail below in conjunction with the system structure shown in FIG. 2.

In an initial state, the smart broadcast hardware can communicate with the server through the equipped communication hardware, and establish a data connection to serve as an instruction channel for receiving an instruction from the server. With respect to the payment client, it is also possible to communicate with the server through communication hardware carried on a mobile terminal where the payment client is located, and establish a data connection to serve as an interaction channel when performing business interaction between the service client and the server.

The specific type of the data connection is not particularly limited in this specification, and be a long connection or a short connection created based on any type of communication protocol, for example, a long connection and a short connection based on a TCP protocol, a long connection and a short connection based on an http/https protocol, etc.

It should be noted that, in this specification, the smart broadcast device can directly perform business connection with the server, and the service client and the smart broadcast device may not maintain any form of data connection so as to achieve the decoupling between the smart broadcast device and the service client in real sense.

For example, in traditional pushing methods, the marketing content is usually pushed directly from the server to the service client, and is output to the user through the visual user interface carried on the service client; or, the service client forwards the marketing content pushed by the server to the smart broadcast device in a manner of short distance wireless communication through a short distance wireless connection kept with the smart broadcast device such as a WI-FI connection or a Bluetooth connection to perform audio broadcast. In this specification, the smart broadcast device can be directly interconnected with the server, and receive marketing information related to the service carried on the service client only through the server. The server no longer needs to forward the marketing information to the smart broadcast device through the service client for audio broadcast.

The server, when pushing the marketing content related to the service carried on the service client to a user through the smart broadcast device, can push an audio broadcast instruction to the smart broadcast device through the instruction channel. The audio broadcast instruction is configured to trigger the smart broadcast device to download an audio file corresponding to the marketing content. The smart broadcast device, when receiving the audio broadcast instruction, can, in response to the audio broadcast instruction, download an audio file corresponding to the audio broadcast instruction, and play the audio file through an equipped audio player after completing the download.

Of course, in practical application, the server can also use the manner of directly pushing the audio file corresponding to the marketing content to the smart broadcast device to transmit the audio file to the audio broadcast apparatus for audio broadcast, which will not be described in detail in this specification.

In this specification, a triggering method for the server to push the audio broadcast instruction to the smart broadcast device can include the following two cases.

In one case, the server can trigger to actively push the audio broadcast instruction to the smart broadcast device based on system configuration.

During the implementation, the background operating staff of the server can manually configure the related marketing content and audio broadcast instruction in the system background based on specific marketing needs. After the system carried on the server detects the configuration of the operating staff, the pushing of the audio broadcast instruction to the smart broadcast device can be immediately triggered.

For example, the marketing content is the promotion content customized by the service provider of the service client and related to the service carried on the service client. In this case, the operating staff can manually configure the related promotion content in the system background of the server. When the system detects the promotion content configured by the user, the pushing of the audio broadcast instruction to the smart broadcast device can be immediately triggered.

In another case, when the service client initiates an interface invoking with respect to an API related to the service carried on the service client, the server can trigger the pushing of the smart broadcast instruction to the smart broadcast device.

During the implementation, the server can provide corresponding APIs respectively for various functions corresponding to services carried on the service client. The service client can, in response to the triggering operation performed by the user on a particular portal in a user interface, initiate, to the server, an interface invoking of the API corresponding to the business function triggered by the user. The interface invoking request initiated by the service client can be obtained from the server by monitoring the API. The server, after monitoring the request to invoke the API, can immediately trigger the pushing of the smart broadcast instruction to the smart broadcast device, so as to trigger the smart broadcast device to download the promotion content.

For example, the marketing content is the service prompt content that can reflect the service execution state during the service interaction between the server and the service client. In this case, the server can monitor the API to obtain the interface invoking request initiated by the service client. After monitoring the request to invoke any of the APIs, the pushing of the service prompt content that can reflect the service execution state of the service corresponding to the API to the smart broadcast device can be triggered. For example, the service client is the payment client. Assuming that the payment client invokes an API corresponding to a payment receipt function, the promotion content can be prompt content of successful receipt of a payment. The server, after invoking the API to complete corresponding receipt process, can push the smart broadcast instruction to the smart broadcast device, to trigger the smart broadcast device to download the successful receipt prompt content.

Figure 3:
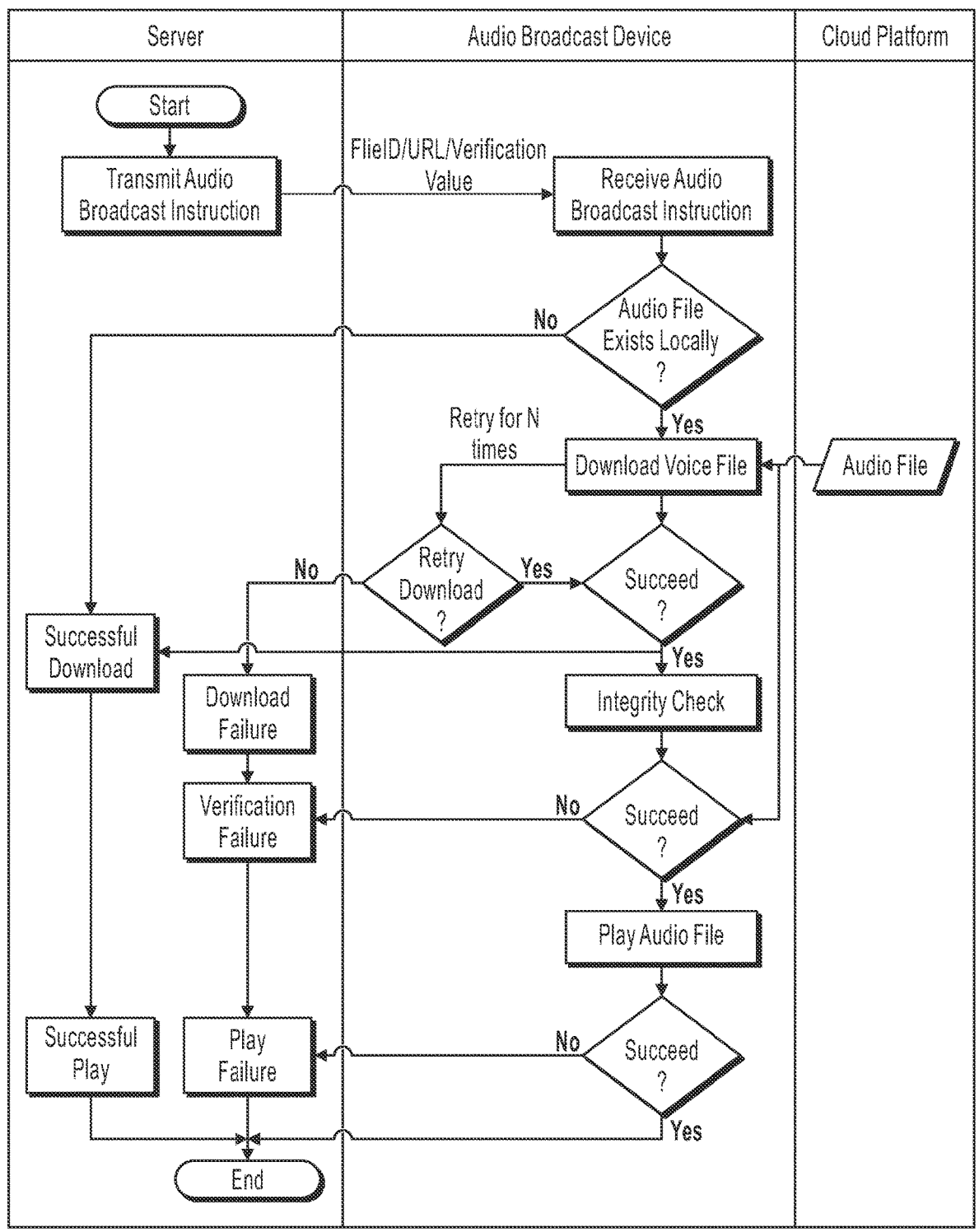
FIG. 3 is an interaction diagram illustrating a server pushing a marketing content to smart broadcast hardware, according to an example implementation of the present specification.

FIG. 3 is an interaction diagram illustrating a server pushing marketing content to smart broadcast hardware, according to the present specification.

As shown in FIG. 3, in an example, the content included in a smart broadcast instruction pushed by the server to a smart broadcast device can include a fileID, a URL, and a verification value.

The fileID indicates a file name of an audio file corresponding to the marketing content, and the fileID can uniquely identify one audio file.

The URL indicates a remote storage address of the audio file corresponding to the marketing content. The smart broadcast device can access the URL address through an http protocol or an http protocol, to download the audio file.

The verification value is a verification value obtained by the server calculating an original content of the audio file based on a particular verification value algorithm, and is configured to perform an integrity verification on the original content of the audio file to prevent the original content of the audio file from being tampered with.

The specific type of the verification value algorithm is not particularly limited in this specification. For example, the verification value can be an MD5 signature obtained by calculating the original content of the audio file using an MD5 algorithm; or, it can also be a hash value obtained by calculating the original content of the audio file using a hash algorithm, which will not be listed one by one in this specification.

Continuing to refer to FIG. 3, the smart broadcast device can receive the audio broadcast instruction pushed by the smart broadcast device through an instruction channel between the smart broadcast device and the server. In order to ensure the security of the pushed audio broadcast instruction, in an example, a data connection between the smart broadcast device and the server can also be encrypted based on a predetermined encryption algorithm to create a secure instruction channel, and the audio broadcast instruction pushed by the server is received based on the secure instruction channel.

The smart broadcast device, when receiving the smart broadcast instruction pushed by the server, can parse the content carried in the smart broadcast instruction, and download the audio file corresponding to the smart broadcast instruction based on the content carried in the smart broadcast instruction.

As shown in FIG. 3, the smart broadcast device can first read the fileID of the audio file carried in the smart broadcast instruction, and search locally based on the fileID to determine whether an audio file corresponding to the fileID has been stored locally.

If the file corresponding to the fileID has been stored locally, at this time, a successful downloading identifier can be fed back to the server, and an equipped audio player is directly invoked to play the audio file.

Continuing to refer to FIG. 3, if the file corresponding to the fileID is not stored locally, at this time, a URL address carried in the smart broadcast instruction can be further read, and the audio file corresponding to the smart broadcast instruction is downloaded remotely by accessing the URL address.

In order to prompt the security of the audio file and prevent the audio file from being tampered with, in this specification, the audio file can be stored on a third-party storage platform separate from the server. For example, as shown in FIG. 3, the audio file can be stored on a third-party cloud storage platform separate from the server.

Of course, in practical application, the audio file can also be stored on the server, which is not particularly limited in this specification.

In this case, the instruction channel for the smart broadcast device to receive the smart broadcast instruction can be isolated from the download channel for the smart broadcast device to download the audio file, so that the smart broadcast device can complete the reception of the instruction and the downloading of the audio file through different channels. In this multi-channel manner, a probability for the audio file to be stolen and tampered with because the channel faces a risk of security can be largely reduced.

When the smart broadcast device downloads the audio file from the cloud platform based on the URL address, any file transfer protocol or method can be adopted, and a maximum number of downloads can be set simultaneously. If the downloading is not successful within the specified number of downloads, the smart broadcast device can return a download failure indicator to the server.

Continuing to refer to FIG. 3, if the smart broadcast device successfully downloads the audio file from the cloud storage platform, at this time, the smart broadcast device can further read the verification value carried in the smart broadcast instruction and verify the integrity of the downloaded audio file based on the verification value.

Specifically, the smart broadcast device can use the same verification algorithm to perform a verification calculation on the downloaded audio file to acquire a verification value, and then use the acquired verification value to match the verification value carried in the audio broadcast instruction.

If the acquired verification value is the same as the verification value carried in the audio broadcast instruction, at this time, the integrity verification is passed, indicating that the original content of the audio file has not been tampered with. In this case, in one aspect, the audio broadcast device can store the audio file locally. In another aspect, the audio broadcast device can directly invoke the equipped audio player to play the audio file. If the playing is successful, a successful play identifier can be returned to the server. If the playing is not successful, an unsuccessful play identifier can be returned to the server.

If the acquired verification value is not the same as the verification value carried in the audio broadcast instruction, at this time, the integrity verification is not passed, indicating that the original content of the audio file can have been tampered with or not be completely downloaded during the downloading. In this case, the audio broadcast device can directly return an integrity verification failure indicator to the server. Then the audio file is re-downloaded from the cloud storage platform based on the URL address, and the verification process shown above is re-performed after the downloading is complete.

It can be known from the above technical solutions that, in this specification, in one aspect, online audio broadcasting the marketing content related to the service carried on the service client interfacing with the server, by means of the smart broadcast device interfacing with the server, can more humanly and intuitively push the marketing content to the user and help to improve user experience.

In another aspect, since online interaction is not required any longer between the smart broadcast device and the service client, decoupling between the smart broadcast device and the service client is fundamentally achieved, so that the server, by transmitting the audio broadcast instruction to the smart broadcast device, can trigger the smart broadcast device to download the audio file corresponding to the audio broadcast instruction and locally audio broadcast the audio file, thereby reducing the implementation complexity when the server pushes the marketing content to the user.

Corresponding to the method examples, the present specification also provides audio broadcast apparatus examples. The audio broadcast apparatus examples of this specification can be applied to an electronic device. The electronic device can be a smart broadcast device.

The apparatus examples can be implemented by software or by hardware or by a combination of software and hardware. Taking software implementation as an example, as a logical apparatus, it is formed by a processor of an electronic device, where it is located, reading corresponding computer program instructions in a non-volatile memory into a memory for execution. In terms of hardware, as shown in FIG. 4, which is a hardware structural diagram illustrating an electronic device where an audio broadcast apparatus is located according to the present specification, in addition to a processor, a memory, a network interface, a speaker, communication hardware, and a non-volatile memory shown in FIG. 4, the electronic device where the apparatus is located in the examples can usually further include other hardware based on the actual function of the electronic device, which will not be described herein again.

Figure 5:
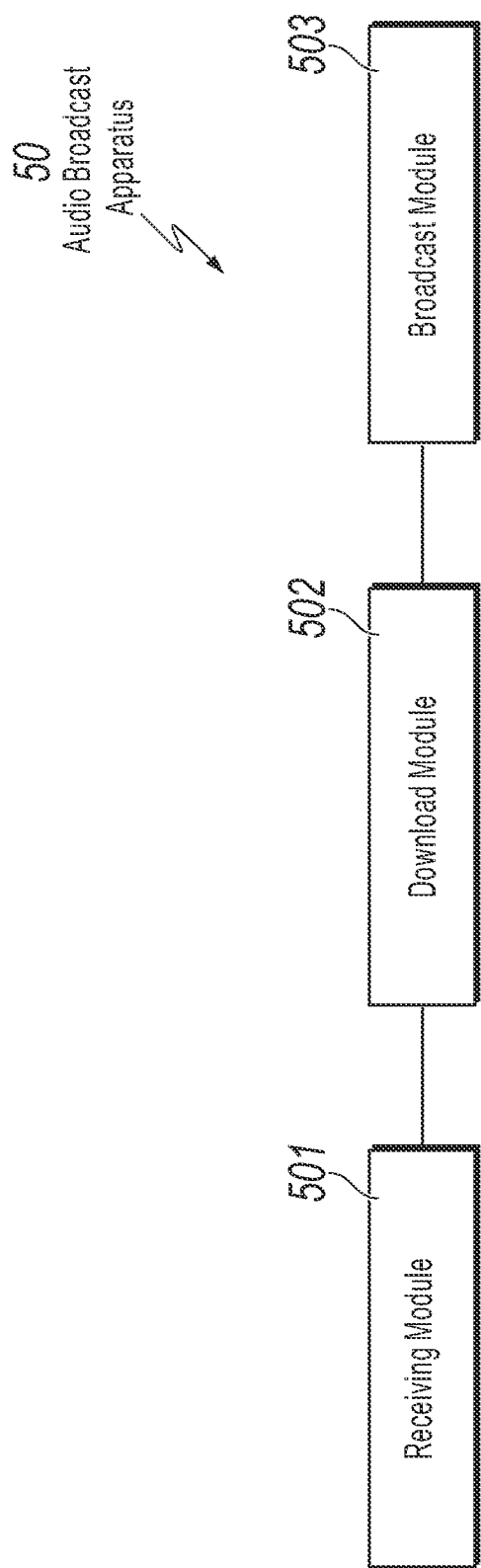
FIG. 5 is a logic block diagram illustrating an audio broadcast apparatus, according to an example implementation of the present specification.

FIG. 5 is a block diagram illustrating an audio broadcast apparatus according to an example of the present specification.

Figure 4:
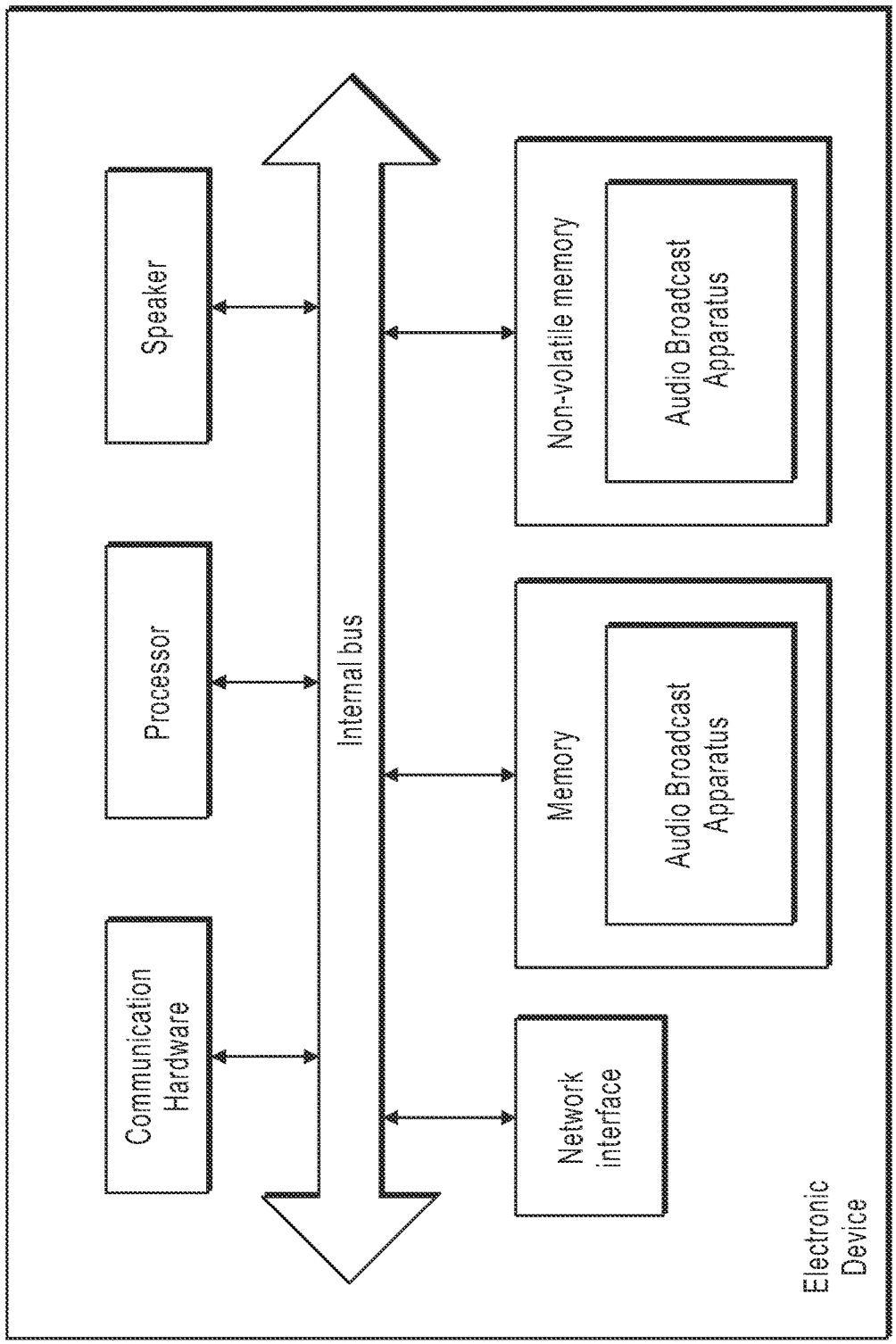
FIG. 4 is a hardware structural diagram illustrating an electronic device carrying an audio broadcast apparatus, according to an example implementation of the present specification.

Referring to FIG. 5, an audio broadcast apparatus 50 can be applied to an electronic device shown in FIG. 4, and includes a receiving module 501, a download module 502, and a broadcast module 503.

The receiving module 501 receives an audio broadcast instruction pushed by a server.

The download module 502, in response to the audio broadcast instruction, downloads an audio file corresponding to the audio broadcast instruction, wherein the audio file includes a marketing content related to a service carried on a service client interfacing with the server.

The broadcast module 503 broadcasts the audio file through an equipped audio player.

In this example, the receiving module 501 receives the audio broadcast instruction pushed by the server through an encrypted data connection channel.

In this example, the audio broadcast instruction includes a file name corresponding to the audio file, and a download address corresponding to the audio file; the download module 502 searches locally to determine whether an audio file corresponding to the file name in the audio broadcast instruction is stored; and if an audio file corresponding to the file name is not stored locally, downloads the corresponding audio file based on the download address in the audio broadcast instruction.

In this example, the audio file is stored on a third-party storage platform separate from the server.

In this example, the audio broadcast instruction further includes a verification value generated based on an original file content of the audio file; the download module 502, before broadcasting the downloaded audio file through the equipped audio player, performs a calculation on a file content of the audio file to acquire a verification value; determines whether the acquired verification value matches a verification value in the audio file; and if the acquired verification value matches the verification value in the audio file, broadcasts the audio file through the equipped audio player.

In this example, the audio broadcast instruction is actively pushed by the server based on a configuration, or pushed by the server in a triggering manner upon receiving an interface invoking with respect to an API related to the service, which is initiated by the service client.

For details about the implementation process of functions and roles of modules in the above apparatus, reference can be made to the implementation process of corresponding steps in the above method, which will not be described herein again.

Corresponding to the method examples, the present specification also provides electronic device examples. The electronic device includes: a processor, and a memory for storing machine executable instructions, wherein the processor and the memory are usually connected to each other via an internal bus. In other possible implementations, the device can further include an external interface to enable communication with other devices or components.

In this example, by reading and executing the machine executable instructions corresponding to a control logic of an audio broadcast stored in the memory, the processor is configured to: receive an audio broadcast instruction pushed by a server; in response to the audio broadcast instruction, download an audio file corresponding to the audio broadcast instruction, wherein the audio file includes a marketing content related to a service carried on a service client interfacing with the server; and broadcast the audio file through an equipped audio player.

In this example, by reading and executing the machine executable instructions corresponding to a control logic of an audio broadcast stored in the memory, the processor is further configured to: receive the audio broadcast instruction pushed by the server through an encrypted data connection channel.

In this example, the audio broadcast instruction includes a file name corresponding to the audio file, and a download address corresponding to the audio file; by reading and executing the machine executable instructions corresponding to a control logic of an audio broadcast stored in the memory, the processor is further configured to: search locally to determine whether an audio file corresponding to the file name in the audio broadcast instruction is stored; and if an audio file corresponding to the file name is not stored locally, download the corresponding audio file based on the download address in the audio broadcast instruction.

In this example, the audio broadcast instruction further includes a verification value generated based on an original file content of the audio file; by reading and executing the machine executable instructions corresponding to a control logic of an audio broadcast stored in the memory, the processor is further configured to:

before broadcasting the audio file through the equipped audio player, perform a calculation on a file content of the downloaded audio file to acquire a verification value; determine whether the acquired verification value matches a verification value in the audio file; and if the acquired verification value matches the verification value in the audio file, broadcast the audio file through the equipped audio player.

The specific examples of the present specification have been described above. Other examples fall within the scope of the appended claims. In some cases, actions or steps described in the claims can be performed in a different order from that in the examples, and a desired result can still be achieved. In addition, the processes depicted in the drawings do not necessarily require the shown particular order or consecutive order to achieve the desired results. In some examples, multi-task processing and parallel processing are also possible or can be advantageous.

The examples in this specification are described in a progressive manner, and the same or similar parts between the examples can refer to each other. Each example focuses on differences from other examples. In particular, with respect to the examples of the apparatus, system, electronic device, and non-volatile computer storage medium, since they are basically similar to the method examples, the description thereof is relatively simple. For the related parts, reference can be made to the description of the method examples.

It can be known from the description of the examples that a person of ordinary skill in the art clearly understands the examples of the present specification can be implemented by means of software and a necessary universal hardware platform. Based on such understanding, the technical solutions according to the examples of the present specification in essence or a part thereof that contributes to the existing technology can be embodied in form of a software product. The computer software product can be stored in a storage medium such as an ROM/RAM, a magnetic disk, and an optical disk, and include a number of instructions for causing a computer equipment, which can be a personal computer, a server, or a network device, etc., to execute the methods described in each of or some examples of the present specification.

The system, apparatus, module, or unit illustrated in the above examples can be implemented by using a computer chip or an entity, or by using a product having a certain function. A typical implementation device is a computer, and the specific form of the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The examples in this specification are described in a progressive manner, and the same or similar parts between the examples can refer to each other. Each example focuses on differences from other examples. In particular, with respect to the apparatus examples, since they are basically similar to the method examples, the description thereof is relatively simple. For the related parts, reference can be made to the description of the method examples. The apparatus examples described above are merely illustrative, wherein the modules described as separate components may or may not be physically separated. During the implementation of the solutions according to the examples of the present specification, the function of each module can be realized in the same one or more software and/or hardware. Some or all of the modules can be selected according to actual needs to achieve the objectives of solutions in the examples. Those of ordinary skill in the art can understand and implement the present specification without any creative effort.

The above are only specific embodiments of the examples of the present specification. It should be noted that for those of ordinary skill in the art, without departing from the principle of the examples of the present specification, some improvements and modifications can be made. These improvements and modifications should also be regarded to fall within the protection scope of the examples of the present specification.

What is claimed is:

1. A method for broadcasting audio, comprising:
   receiving, from a server by a smart broadcasting device, an audio broadcast instruction that includes a verification value generated based on an original content of an audio file that corresponds to the audio broadcast instruction using a verification value algorithm;
   in response to receiving the audio broadcast instruction, downloading the audio file corresponding to the audio broadcast instruction to obtain a downloaded audio file;
   performing an integrity verification of the downloaded audio file, comprising:
   performing a verification calculation on the downloaded audio file using the verification value algorithm to obtain an acquired verification value; and
   determining whether the acquired verification value matches the verification value carried in the audio broadcast instruction; and
   broadcasting, by the smart broadcasting device, the audio file by using a speaker of the smart broadcasting device if the acquired verification value matches the verification value carried in the audio broadcast instruction.

2. The method according to claim 1, wherein receiving the audio broadcast instruction comprises:
   receiving the audio broadcast instruction pushed by the server through encrypted communication channels.

3. The method according to claim 1, wherein the audio broadcast instruction specifies a file name of the audio file, and an address for downloading the audio file; and
   downloading the audio file corresponding to the audio broadcast instruction comprises:
   performing local search to determine whether an audio file corresponding to the file name specified by the audio broadcast instruction is stored locally; and
   if the audio file corresponding to the file name is not stored locally, downloading the audio file from the address specified by the audio broadcast instruction.

4. The method according to claim 3, wherein the audio file is stored on a third-party storage platform that is separate from the server.

5. The method according to claim 1, wherein the verification value generated based on the original content of the audio file is a MD5 signature.

6. The method according to claim 1, wherein the audio broadcast instruction is proactively pushed by the server based on a predetermined configuration.

7. The method according to claim 1, wherein the audio broadcast instruction is pushed by the server upon receiving an invocation of a service-related API, wherein the invocation is initiated by the smart broadcasting device associated with the server.

8. A smart broadcasting device comprising:
   one or more computers and one or more storage devices storing instructions that are operable, when executed by the one or more computers, to cause the one or more computers to perform operations comprising:
   receiving, from a server by a smart broadcasting device, an audio broadcast instruction that includes a verification value generated based on an original content of an audio file that corresponds to the audio broadcast instruction using a verification value algorithm;
   in response to receiving the audio broadcast instruction, downloading the audio file corresponding to the audio broadcast instruction to obtain a downloaded audio file;
   performing an integrity verification of the downloaded audio file, comprising:
   performing a verification calculation on the downloaded audio file using the verification value algorithm to obtain an acquired verification value; and
   determining whether the acquired verification value matches the verification value carried in the audio broadcast instruction; and
   broadcasting, by the smart broadcasting device, the audio file by using a speaker of the smart broadcasting device if the acquired verification value matches the verification value carried in the audio broadcast instruction.

9. The smart broadcasting device according to claim 8, wherein receiving the audio broadcast instruction comprises:
   receiving the audio broadcast instruction pushed by the server through encrypted communication channels.

10. The smart broadcasting device according to claim 8, wherein the audio broadcast instruction specifies a file name of the audio file, and an address for downloading the audio file; and downloading the audio file corresponding to the audio broadcast instruction comprises:

performing local search to determine whether an audio file corresponding to the file name specified by the audio broadcast instruction is stored locally; and if the audio file corresponding to the file name is not stored locally, downloading the audio file from the address specified by the audio broadcast instruction.

11. The smart broadcasting device according to claim 10, wherein the audio file is stored on a third-party storage platform that is separate from the server.

12. The smart broadcasting device according to claim 8, wherein the verification value generated based on the original content of the audio file is a MD5 signature.

13. The smart broadcasting device according to claim 8, wherein the audio broadcast instruction is proactively pushed by the server based on a predetermined configuration.

14. The smart broadcasting device according to claim 8, wherein the audio broadcast instruction is pushed by the server upon receiving an invocation of a service-related API, wherein the invocation is initiated by the smart broadcasting device associated with the server.

15. One or more non-transitory computer storage media encoded with computer program instructions that when executed by a smart broadcasting device cause the smart broadcasting device to perform operations comprising:

receiving, from a server by a smart broadcasting device, an audio broadcast instruction that includes a verification value generated based on an original content of an audio file that corresponds to the audio broadcast instruction using a verification value algorithm;

in response to receiving the audio broadcast instruction, downloading the audio file corresponding to the audio broadcast instruction to obtain a downloaded audio file;

performing an integrity verification of the downloaded audio file, comprising:

performing a verification calculation on the downloaded audio file using the verification value algorithm to obtain an acquired verification value; and determining whether the acquired verification value matches the verification value carried in the audio broadcast instruction; and broadcasting, by the smart broadcasting device, the audio file by using a speaker of the smart broadcasting device if the acquired verification value matches the verification value carried in the audio broadcast instruction.

16. The non-transitory computer storage media according to claim 15, wherein receiving the audio broadcast instruction comprises:

receiving the audio broadcast instruction pushed by the server through encrypted communication channels.

17. The non-transitory computer storage media according to claim 15, wherein the audio broadcast instruction specifies a file name of the audio file, and an address for downloading the audio file; and downloading the audio file corresponding to the audio broadcast instruction comprises:

performing local search to determine whether an audio file corresponding to the file name specified by the audio broadcast instruction is stored locally; and if the audio file corresponding to the file name is not stored locally, downloading the audio file from the address specified by the audio broadcast instruction.

18. The non-transitory computer storage media according to claim 17, wherein the audio file is stored on a third-party storage platform that is separate from the server.

19. The non-transitory computer storage media according to claim 15, wherein the verification value generated based on the original content of the audio file is a MD5 signature.

20. The non-transitory computer storage media according to claim 15, wherein the audio broadcast instruction is proactively pushed by the server based on a predetermined configuration.

21. The non-transitory computer storage media according to claim 15, wherein the audio broadcast instruction is pushed by the server upon receiving an invocation of a service-related API, wherein the invocation is initiated by the smart broadcasting device associated with the server.

\* \* \* \* \*